United States Patent
Lin et al.

(10) Patent No.: US 8,893,265 B2
(45) Date of Patent: Nov. 18, 2014

(54) APPARATUS FOR WAKING UP A SYSTEM AND THE COMPUTER SYSTEM USING THE SAME

(71) Applicants: Shang-Heng Lin, Taipei (TW); Pi-Chiang Lin, Hsinchu (TW)

(72) Inventors: Shang-Heng Lin, Taipei (TW); Pi-Chiang Lin, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 38 days.

(21) Appl. No.: 13/889,373

(22) Filed: May 8, 2013

(65) Prior Publication Data
US 2013/0312089 A1 Nov. 21, 2013

(30) Foreign Application Priority Data
May 18, 2012 (TW) .............................. 101209418 U

(51) Int. Cl.
*G06F 21/81* (2013.01)
*G06F 21/31* (2013.01)

(52) U.S. Cl.
CPC ................ *G06F 21/31* (2013.01); *G06F 21/81* (2013.01)
USPC ........................................................ 726/19

(58) Field of Classification Search
USPC .................... 726/19, 26; 713/2, 164, 165, 183
See application file for complete search history.

(56) References Cited

U.S. PATENT DOCUMENTS

| | | | | |
|---|---|---|---|---|
| 6,460,143 | B1 * | 10/2002 | Howard et al. ............... | 713/323 |
| 2002/0035702 | A1 * | 3/2002 | Chu et al. ...................... | 713/323 |
| 2003/0014676 | A1 * | 1/2003 | Wang et al. ................... | 713/323 |
| 2004/0151149 | A1 * | 8/2004 | Song et al. .................... | 370/338 |
| 2007/0260905 | A1 * | 11/2007 | Marsden et al. .............. | 713/323 |
| 2013/0100481 | A1 * | 4/2013 | Lee et al. ..................... | 358/1.14 |

\* cited by examiner

*Primary Examiner* — Beemnet Dada
(74) *Attorney, Agent, or Firm* — Min-Lee Teng; Litron Patent & Trademark Office

(57) ABSTRACT

An apparatus for waking up a computer system is disclosed. The apparatus is electrically coupled to a south bridge, or a Platform Controller Hub (PCH), having a first USB host interface. The apparatus comprises: a second USB host interface; a switch element, for electrically coupling a USB keyboard to either the first USB host interface or the second USB host interface; a control element, electrically coupled to the second USB host interface and the switch element; and a wake-up element, electrically coupled to the control element, wherein when the computer system enters a suspend-to-ram mode, a suspend-to-disk mode or a shutdown mode, the control element controls the switch element to electrically couple the USB keyboard to the second USB host interface; wherein when a user inputs a password, the second USB host interface receives the password and transfers it to the control element, and if the password matches the predetermined password, the control element wakes up the computer system and controls the switch element to electrically couple the USB keyboard to the first USB host interface.

8 Claims, 1 Drawing Sheet

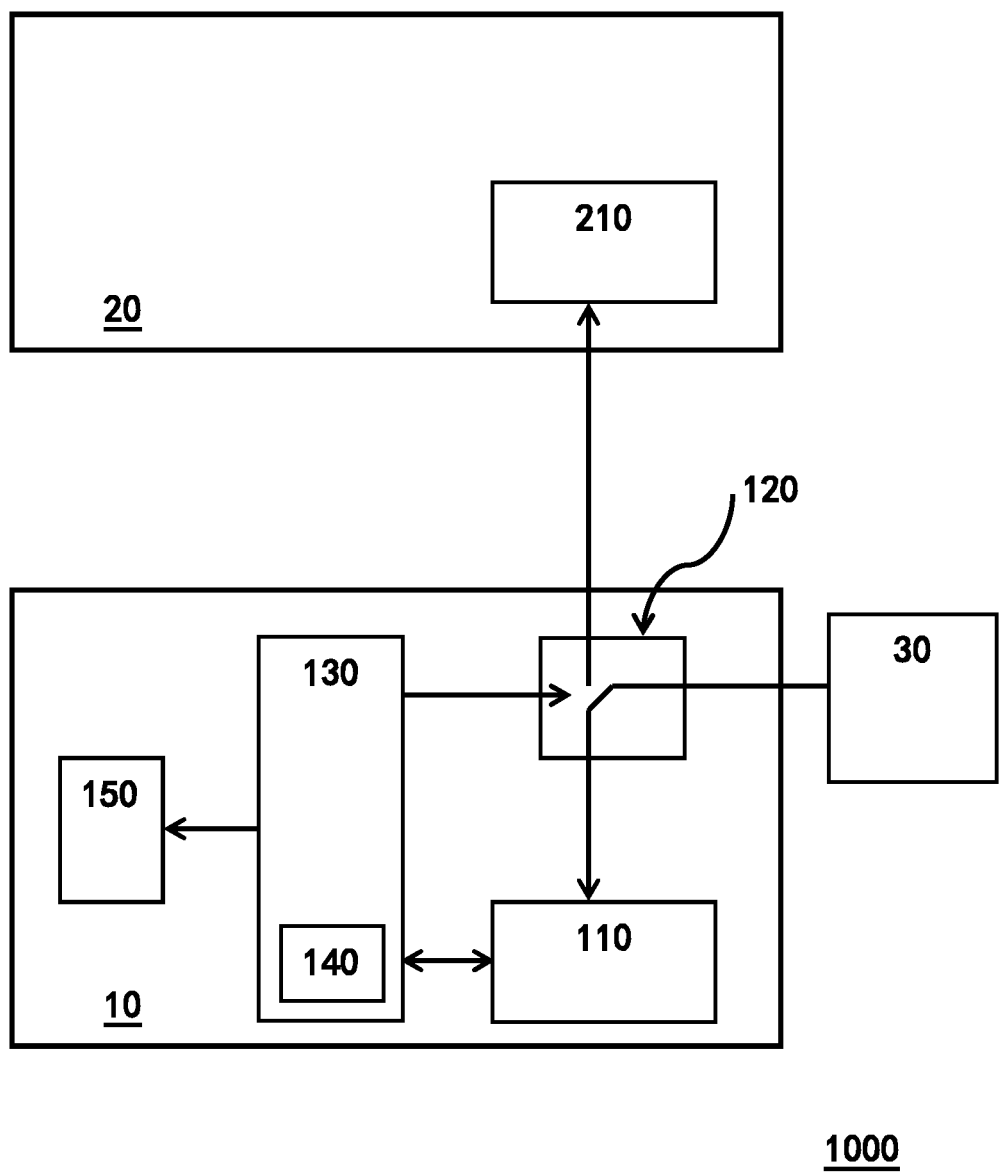

APPARATUS FOR WAKING UP A SYSTEM AND THE COMPUTER SYSTEM USING THE SAME

CROSS REFERENCE TO RELATED APPLICATIONS

This application claims the priority benefit of Taiwan application serial no. 101209418, filed on May 18, 2012. The entirety of the above-mentioned patent application is hereby incorporated by reference herein and made a part of specification.

BACKGROUND OF THE INVENTION

I. Field of the Invention

The present invention relates to an apparatus for waking up a system and, in particular, to an apparatus for waking up a system after the system enters into a suspend-to-ram mode, a suspend-to-disk mode or a shutdown mode.

II. Description of the Prior Art

Nowadays, people usually store a great amount of personal information, pictures or movies on a desktop computer or a notebook.

The conventional way for protecting the safety of a computer is by entering a password for verification after the operation system (OS) is ready or by using a basic input/output system (BIOS) for verification when powering on the computer. However, the verification may not always work because the operation system (OS) or the basic input/output system (BIOS) can be deciphered.

Nowadays, in times when personal privacy cannot be over-emphasized, other ways are needed to protect the safety of a computer.

Taiwan patent 374871 proposes a method to protect the safety of a computer without entering into the operation system (OS) or the basic input/output system (BIOS) of the computer, which is, however, based on a general computer framework, wherein input/output signals through the USB are managed by a south bridge if the computer peripheral device is a universal serial bus (USB) or by a super IO if the computer peripheral device is a personal system/2 (PS/2) interface. The PS/2-interface was very popular for interfacing a keyboard. However, the keyboard with a USB-interface has become the main stream nowadays.

Because super IO does not have a USB host interface, the method proposed in Taiwan patent 374871 cannot be applied if a keyboard with a USB-interface is used.

SUMMARY OF THE INVENTION

One objective of the present invention is to propose an apparatus for waking up a system, which can support a USB keyboard to protect the safety of a computer without entering into an operation system (OS) or a basic input/output system (BIOS).

The first aspect of the present invention is to propose an apparatus for waking up a computer system. The apparatus is electrically coupled to a south bridge, a south/north bridge, or a Platform Controller Hub (PCH), wherein the coupled south bridge, south/north bridge or the Platform Controller Hub (PCH) has a first USB host interface. The apparatus comprises: a second USB host interface; a switch element, for electrically coupling a USB keyboard to either the first USB host interface or the second USB host interface; a control element, electrically coupled to the second USB host interface and the switch element, wherein the control element has a memory element for storing a predetermined password; and a wake-up element, electrically coupled to the control element, wherein when the computer system enters a suspend-to-ram mode, a suspend-to-disk mode or a shutdown mode, the control element controls the switch element to electrically couple the USB keyboard to the second USB host interface; wherein when a user inputs a password with the USB keyboard, the second USB host interface receives the password and transfers the password to the control element, wherein the control element fetches the predetermined password from the memory element and compares the password with the predetermined password; and if the password matches the predetermined password, the control element controls the wake-up element to wake up the computer system; and wherein when the computer system is woken up, the control element controls the switch element to electrically couple the USB keyboard to the first USB host interface.

The second aspect of the present invention is to propose a computer system, wherein the computer system comprises: a USB keyboard; a south bridge or south/north bridge, having a first USB host interface; and a device for waking up a system, which comprises: a second USB host interface; a switch element for electrically coupling a USB keyboard to either the first USB host interface or the second USB host interface; a control element, electrically coupled to the second USB host interface and the switch element, wherein the control element has a memory element for storing a predetermined password; and a wake-up element, electrically coupled to the control element, wherein when the computer system enters a suspend-to-ram mode, a suspend-to-disk mode or a shutdown mode, the control element controls the switch element to electrically couple the USB keyboard to the second USB host interface; wherein when a user inputs a password with the USB keyboard, the second USB host interface receives the password and transfers the password to the control element, wherein the control element fetches the predetermined password from the memory element and compares the password with the predetermined password; and if the password matches the predetermined password, the control element controls the wake-up element to wake up the computer system; and wherein when the computer system is woken up, the control element controls the switch element to electrically couple the USB keyboard to the first USB host interface.

The third aspect of the present invention is to propose a computer system, wherein the computer system comprises: a USB keyboard; a south bridge or south/north bridge, having a first USB host interface; and a device for waking up a system, which comprises: a second USB host interface; a switch element for electrically coupling a USB keyboard to either the first USB host interface or the second USB host interface; a control element, electrically coupled to the second USB host interface and the switch element, wherein the control element has a memory element for storing a predetermined password; and a wake-up element, electrically coupled to the control element, wherein when the display of the computer system turns into a black screen mode, the control element controls the switch element to electrically couple the USB keyboard to the second USB host interface; wherein when a user inputs a password with the USB keyboard, the second USB host interface receives the password and transfers the password to the control element, wherein the control element fetches the predetermined password from the memory element and compares the password with the predetermined password; and if the password matches the predetermined password, the control element controls the wake-up element to wake up the computer system; and wherein when the computer system is woken up, the control element controls the switch element to electrically couple the USB keyboard to the first USB host interface.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein:

FIG. 1 illustrates a schematic diagram of a computer system.

DETAILED DESCRIPTION OF THE INVENTION

The detailed explanation of the present invention is described as follows. To understand the present invention more easily, the described preferred embodiments are presented for purposes of illustrations and description and they are not intended to limit the scope of the present invention. For simplicity, the same or similar code names will be given to the following the same or similar elements.

Firstly, please refer to FIG. 1 which illustrates a schematic diagram of a computer system 1000 in accordance with one embodiment of the present invention. The computer system 1000 comprises a device 10 for waking up a system, a south bridge 20 and a USB keyboard 30. The south bridge 20 has a first USB host interface 210. The device 10 for waking up a system comprises a second USB host interface 110, a switch element 120, a control element 130 and a wake-up element 150, wherein the control element 130 has a memory element 140.

The USB keyboard 30 can be electrically coupled to the first USB host interface 210 or the second USB host interface 110 through the switch element 120. The control element 130 is electrically coupled to the second USB host interface 110, the switch element 120 and the wake-up element 150 and controls the switch element 120 to be selectively electrically coupled to the first USB host interface 210 or the second USB host interface 110. The memory element 140 is used for storing a predetermined password provided by a user.

The computer system 1000 can be a personal computer (PC), a laptop or a notebook. The computer system 1000 has various operating states, such as suspend-to-ram mode, suspend-to-disk mode and S5 shutdown mode, in compliance to the Advanced Configuration and Power Interface (ACPI) specifications.

When the computer system 1000 enters a S3 mode, a S4 mode or a S5 mode, the control element 130 controls the switch element 120 to switch to the second USB host interface 110, and at this moment the display of the computer system 1000 is put into a black screen mode (not shown in FIG. 1). When a user wakes up the computer system 1000, he/she inputs a password through the USB keyboard 30 under the condition that that the display is in a black screen mode. The second USB host interface 110 receives the password inputted by the user and transfers the password to the control element 130. The control element 130 fetches a predetermined password from the memory element 140 and compares the password the user inputs with the predetermined password. If the password matches the predetermined password, the control element 130 sends out a control signal to the wake-up element 150; and the wake-up element 150 receives the control signal and then wakes up the computer system 1000. When the computer system 1000 is woken up, the control element 130 controls the switch element 120 to switch to the first USB host interface 210.

If the password inputted by the user does not match the predetermined password according to the system design, in such case, the computer system 1000 maintains the original working state and keeps the display in a black screen mode.

The predetermined password can be a string of characters or a combination of one or more special function keys, such as 「F1」, 「F4」, 「F1」, 「F4」, or a combination of the hotkeys (e.g., 「A」+「B」 or 「Ctr」+「~」).

It should be noted that although the south bridge 20 is used as an example in the abovementioned embodiments, skilled persons in the art can appreciate that the present invention can be implemented in the framework of Platform Controller Hub (PCH) as well.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for waking up a computer system, wherein the apparatus is electrically coupled to a south bridge having a first USB host interface, the apparatus comprising:
   a second USB host interface;
   a switch element, for electrically coupling a USB keyboard to either the first USB host interface or the second USB host interface;
   a control element, electrically coupled to the second USB host interface and the switch element, wherein the control element has a memory element for storing a predetermined password; and
   a wake-up element, electrically coupled to the control element;
   wherein when the computer system enters a suspend-to-ram mode, a suspend-to-disk mode or a shutdown mode, the control element controls the switch element to electrically couple the USB keyboard to the second USB host interface;
   wherein when a user inputs a password with the USB keyboard, the second USB host interface receives the password and transfers the password to the control element, wherein the control element fetches the predetermined password from the memory element and compares the password with the predetermined password; and if the password matches the predetermined password, the control element controls the wake-up element to wake up the computer system; and
   wherein when the computer system is woken up, the control element controls the switch element to electrically couple the USB keyboard to the first USB host interface.

2. The apparatus for waking up a computer system according to claim 1, wherein the control element compares the password with the predetermined password; and if the password does not match the predetermined password, the computer system maintains the suspend-to-ram mode, the suspend-to-disk mode or the shutdown mode.

3. An apparatus for waking up a computer system, wherein the apparatus is electrically coupled to a south/north bridge having a first USB host interface, the apparatus comprising:
   a second USB host interface;

a switch element, for electrically coupling a USB keyboard to either the first USB host interface or the second USB host interface;

a control element, electrically coupled to the second USB host interface and the switch element, wherein the control element has a memory element for storing a predetermined password; and a wake-up element, electrically coupled to the control element;

wherein when the computer system enters a suspend-to-ram mode, a suspend-to-disk mode or a shutdown mode, the control element controls the switch element to electrically couple the USB keyboard to the second USB host interface;

wherein when a user inputs a password with the USB keyboard, the second USB host interface receives the password and transfers the password to the control element, wherein the control element fetches the predetermined password from the memory element and compares the password with the predetermined password; and if the password matches the predetermined password, the control element controls the wake-up element to wake up the computer system; and wherein when the computer system is woken up, the control element controls the switch element to electrically couple the USB keyboard to the first USB host interface.

4. The apparatus for waking up a computer system according to claim 3, wherein the control element compares the password with the predetermined password; and if the password does not match the predetermined password, the computer system maintains the suspend-to-ram mode, the suspend-to-disk mode or the shutdown mode.

5. A computer system, comprising:

a USB keyboard;

a south bridge having a first USB host interface; and a device for waking up a system, comprising:

a second USB host interface;

a switch element, for electrically coupling a USB keyboard to either the first USB host interface or the second USB host interface;

a control element, electrically coupled to the second USB host interface and the switch element, wherein the control element has a memory element for storing a predetermined password; and a wake-up element, electrically coupled to the control element;

wherein when the computer system enters a suspend-to-ram mode, a suspend-to-disk mode or a shutdown mode, the control element controls the switch element to electrically couple the USB keyboard to the second USB host interface;

wherein when a user inputs a password with the USB keyboard, the second USB host interface receives the password and transfers the password to the control element;

wherein the control element fetches the predetermined password from the memory element and compares the password with the predetermined password; and if the password matches the predetermined password, the control element controls the wake-up element to wake up the computer system; and wherein when the computer system is woken up, the control element controls the switch element to electrically couple the USB keyboard to the first USB host interface.

6. The computer system according to claim 5, wherein the control element compares the password with the predetermined password; and if the password does not match the predetermined password, the computer system maintains the suspend-to-ram mode, the suspend-to-disk mode or the shutdown mode.

7. A computer system, comprising:

a USB keyboard;

a south bridge having a first USB host interface; and a device for waking up a system, comprising:

a second USB host interface;

a switch element, for electrically coupling a USB keyboard to either the first USB host interface or the second USB host interface;

a control element, electrically coupled to the second USB host interface and the switch element, wherein the control element has a memory element for storing a predetermined password; and a wake-up element, electrically coupled to the control element;

wherein when the display of the computer system turns into a black screen mode, the control element controls the switch element to electrically couple the USB keyboard to the second USB host interface;

wherein when a user inputs a password with the USB keyboard, the second USB host interface receives the password and transfers the password to the control element, wherein the control element fetches the predetermined password from the memory element and compares the password with the predetermined password; and if the password matches the predetermined password, the control element controls the wake-up element to wake up the computer system; and wherein when the computer system is woken up, the control element controls the switch element to electrically couple the USB keyboard to the first USB host interface.

8. The computer system according to claim 7, wherein the control element compares the password with the predetermined password; and if the password does not match the predetermined password, the computer system maintains the display in the black screen mode.

* * * * *